United States Patent
Park

(10) Patent No.: US 6,289,760 B1
(45) Date of Patent: Sep. 18, 2001

(54) MOUNTING STRUCTURE OF CHANGE LEVER IN VEHICLE

(75) Inventor: Min-Soo Park, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/442,064

(22) Filed: Nov. 16, 1999

(30) Foreign Application Priority Data

Jan. 18, 1999 (KR) ........................................... 99-505

(51) Int. Cl.$^7$ ........................... B60K 20/02; F16H 59/04
(52) U.S. Cl. ........................ 74/473.34; 403/132; 403/145
(58) Field of Search ..................... 74/473.34; 403/132, 403/130, 122, 144, 145, 146

(56) References Cited

U.S. PATENT DOCUMENTS

| | | | | |
|---|---|---|---|---|
| 2,857,190 | * | 10/1958 | Mioskovitz | 403/130 |
| 2,933,309 | * | 4/1960 | Heiss | 403/130 |
| 2,942,901 | * | 6/1960 | Booth | 403/132 |
| 3,216,753 | * | 11/1965 | Oishei | 403/139 |
| 3,347,576 | * | 10/1967 | Tempeleton | 403/133 |
| 3,731,957 | * | 5/1973 | Uchida | 403/130 |
| 4,305,676 | * | 12/1981 | Wallbank | 403/130 |
| 5,509,749 | * | 4/1996 | Eifert et al. | 403/132 |

FOREIGN PATENT DOCUMENTS 41 22 677 * 1/1993 (DE) .

* cited by examiner

Primary Examiner—David A. Bucci
Assistant Examiner—William C Joyce
(74) Attorney, Agent, or Firm—Christie, Parker & Hale, LLP

(57) ABSTRACT

A mounting structure of a change lever in a vehicle constructed and arranged to absorb an allowance between a housing and a ball rotatively pivoting a lower end of the change lever to rule out generation of noise and to prevent leakage of lubricant coated on a frictional part located therebetween, thereby improving a lever-shifting feeling, the change lever having a change lever knob thereon and a ball thereunder and accommodated in a housing forming a spherical inner space therein for rotation, the structure comprising a support member integrally formed at a lower end of the change lever with a cylindrical upper body unit inserted into a change lever and a spherical inner lower body unit having its diameter expanded at a lower part of the upper body unit and its upper surface adhered to a lower surface of the ball and its lower surface adhered to an inner surface of the housing.

4 Claims, 3 Drawing Sheets

MOUNTING STRUCTURE OF CHANGE LEVER IN VEHICLE

BACKGROUND OF THE INVENTION

1. Field of the Invention

The present invention relates to a change lever in a transmission and more particularly to a mounting structure of a change lever in a vehicle constructed and arranged to absorb an allowance between a housing and a ball rotatively pivoting a lower end of the change lever to rule out generation of noise and to prevent leakage of lubricant coated on a frictional part located therebetween, thereby improving a lever-shifting feeling.

2. Description of the Prior Art

Generally, a vehicle is equipped with a transmission for changing a driving force generated from an engine to appropriately suit to a running state and the transmission is operated by manipulation of a change lever provided at a side of a driver. Particularly, a rod-type change lever mechanism in a vehicle mounted with a manual transmission is illustrated in FIG. 1.

In other words, a change lever 1 is mounted with a change lever knob 2 at an upper end thereof for a driver to hold and a hollow member extended lengthwise downwards, where a lower part of the change lever 1 covered with a dust cover 3 for preventing inroad of foreign objects is pivoted and rotatively fixed to the body of the vehicle.

At this time, the lower part of the change lever 1 centrally pierces a ball 4 via a pin 5 to thereafter be coupled to the ball 4. The ball 4 is supportively accommodated in a housing 6 to form an inner spherical space therein.

The housing 6 is opened at a top side thereof to accommodate the change lever 1 therein, and includes an upper member 6a formed with an inner circumferential surface to encompass an upper side of the ball 4 and a lower member 6b formed to encompass a lower part of the ball 4.

Furthermore, the change lever 1 is disposed via a ball joint 7a with a shift rod 7 for transmitting an operation direction of the change lever 1 to a transmission to enable changing speed. The housing 6 is arranged at a front side thereof with an extension bar 8 for preventing the so-called Gear Jump Out state, where meshing among teeths in the transmission is released while a sudden change of inertia such as sudden acceleration occurs.

Between the ball 4 fixed via the pin 5 to a lower end of the change lever 1 and the housing 6 for accommodating the ball 4 therein there is coated grease as lubricant to reduce friction which occurs therebetween during changing speed.

When a driver holds the change lever knob 2 to manipulate the change lever 1 back and forth, a manipulating force thereof is transmitted to a transmission via the shift rod 7 to get the vehicle shifted in gears.

However, there is a problem in the conventional change lever 1 thus constructed in that, when there occurs an allowance between the ball 4 and the housing 6 encompassing and supporting the ball 4, an intermittent contact is generated between the ball 4 and the housing 6 due to vibration of the body generated by the operation of the engine to thereby generate noise between the ball 4 and the housing 6.

There is another problem in that lubricant coated for reduction of friction between the ball 4 and the housing 6 drips down along a gap generated therebetween due to repeated manipulation of lever shifting, causing decrease of the lubricant and deteriorated shifting feel to the driver during change lever shifting.

SUMMARY OF THE INVENTION

The present invention is disclosed to solve the aforementioned problems and it is an object of the present invention to provide a mounting structure of change lever in a vehicle constructed and arranged to absorb an allowance generated between the ball rotatively supporting a lower part of the change lever and a housing and to prevent leakage of lubricant coated therein, thereby ruling out generation of noise and improving a change lever shifting feel.

In accordance with the object of the present invention, there is provided a mounting structure of change lever in a vehicle, the change lever having a change lever knob thereon and a ball thereunder and accommodated in a housing forming a spherical inner space therein for rotation, the structure comprising a support member integrally formed at a lower end of the change lever with a cylindrical upper body unit inserted into a change lever and a spherical inner lower body unit having its diameter expanded at a lower part of the upper body unit and its upper surface adhered to a lower surface of the ball is and its lower surface adhered to an inner surface of the housing.

Furthermore, the mounting structure according to the present invention comprises an O-ring between the upper surface of the lower body unit and the lower surface of the ball.

BRIEF DESCRIPTION OF THE DRAWINGS

For fuller understanding of the nature and objects of the invention, reference should be made to the following detailed description taken in conjunction wi the accompanying drawings in which.

DETAILED DESCRIPTION OF THE INVENTION

Preferred embodiment of the present invention will now be described in detail with reference to the accompanying drawings.

Figure 1:
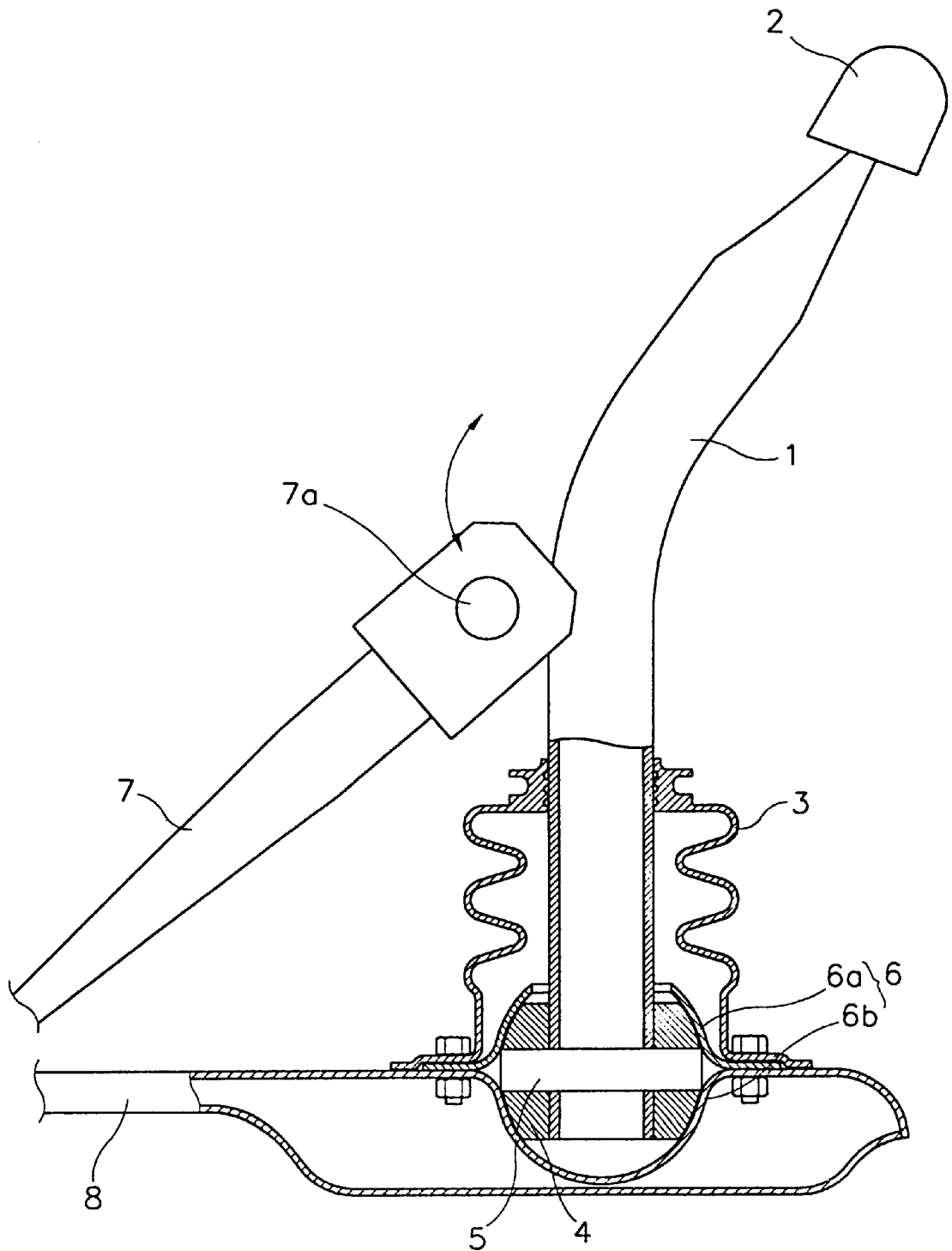
FIG. 1 is a sectional view for illustrating a mounted structure according to the conventional change lever.
Figure 2:
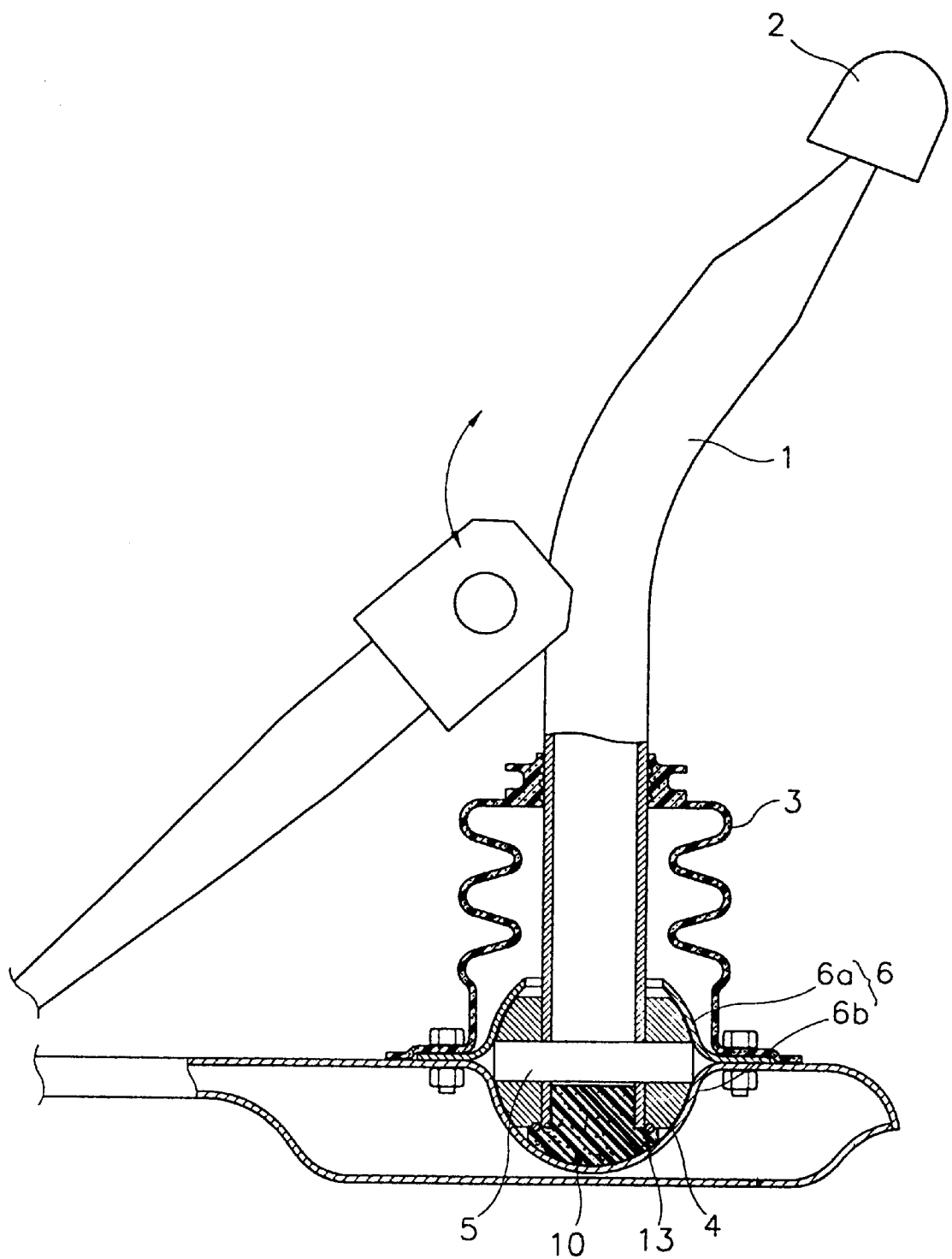
FIG. 2 is a sectional view for illustrating a mounted structure of a change lever according to the present invention.

As illustrated in FIG. 2, a change lever 1 of a hollow member is mounted thereon with a change lever knob 2 for a driver to hold for gear shifting and extended lengthwise, and is covered thereunder with a dust cover 3 for preventing inroad of foreign objects and rotatively fixed to the body for pivotal movement.

Furthermore, the change lever 1 is accommodated thereunder with a ball 4 in a housing 6 having an upper member 6a and a lower member 6b bent to form a spherical inner space therein while the ball 4 vertically pass therethrough, where the ball 4 is secured at a lower end of the change lever 1 via a pin 5 passing through the ball 4 and the change lever 1 horizontally. The change lever 1 is coupled thereunder to a support member 10 made of a resin having a resilient property, such as rubber, and is securely accommodated in the housing 6 via the support member 10.

Figure 3:
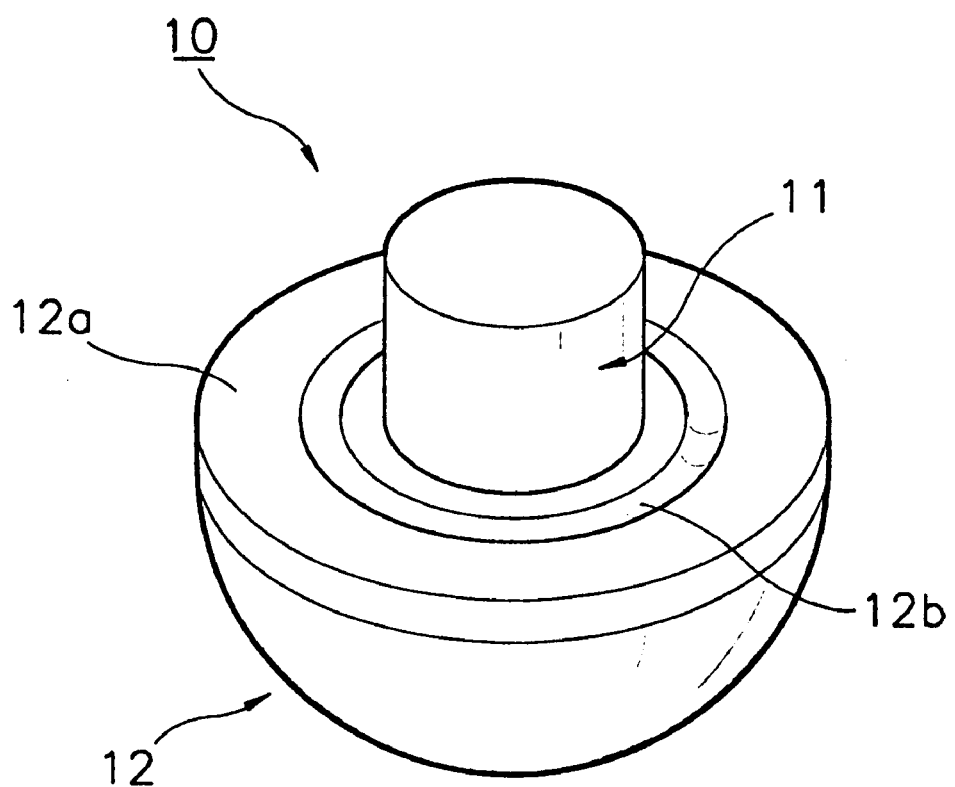
FIG. 3 is a perspective of principal parts in FIG. 2.

At this time, the support member 10 is integrally formed with, as illustrated in FIG. 3, a cylindrical upper body unit 11 inserted into a lower part of the hollow change lever 1 and a semi-spherical lower body unit 12 extended in diameter at a lower part of the upper body unit 11.

Furthermore, an O-ring 13 is disposed between an upper surface 12a of the lower body unit 12 at the support member 10 and a bottom surface of the ball to thereby secure a further airtightness between the ball 4 and the support member 10.

To assist a further airtightness, the upper surface 12a of the lower body unit 12 at the support member 10 is formed at a concentric circle thereof with a concave accommodation groove 12b and another accommodation groove (not shown) is formed at a bottom surface of the ball 4 facing the accommodation groove 12b, between which the O-ring 13 is securely accommodated.

When the change lever 1 is secured at a lower part thereof with the support member 10 made of rubberish resilient material to resiliently support the lower part of the ball 4, the support member 10 pushes up the ball 4 elastically inside the house 6, demonstrating its characteristical resilience, even though there is generated an allowance between the ball 4 and the housing 6, such that the ball 4 is adhesively supported inside the inner surface of the housing 6 thereby eliminating generation of noise occurring between the ball 4 and the housing due to vibration caused by the operation of the engine.

Furthermore, the O-ring 13 mounted between the ball 4 and the support member 10 prevents the lubricant coated on the ball 4 and the housing 6 from infusing into the hollow change lever 1 when it flows down along a gap between the ball 4 and the housing due to repeated manipulation of the change lever 1, such that deteriorating feeling of gear shifting felt by a driver due to decrease of lubricant coated between the ball 4 and housing 6 can be removed.

As apparent from the foregoing, there is an advantage in the mounting structure of change lever in a vehicle according to the present invention in that the change lever 1 is additionally mounted at a lower part thereof with the rubberish resilient support member 10 to result in a smooth adherence between the ball 4 and the housing 6, thereby removing a possible generation of noise caused by vibration and preventing leakage of lubricant to other parts of the vehicle and deteriorating feeling of gear shifting.

What is claimed is:

1. A mounting structure of a change lever in a vehicle, the change lever having a change lever knob thereon and a ball thereunder and accommodated in a housing forming a spherical inner space therein for rotation;

the structure comprising a support member integrally formed at a lower end of the change lever with a cylindrical upper body unit inserted into a change lever and a spherical inner lower body unit having its diameter expanded at a lower part of the upper body unit and its upper surface adhered to a lower surface of the ball and its lower surface adhered to an inner surface of the housing; and an O-ring positioned between the upper surface of the lower body unit and the lower surface of the ball.

2. The structure as defined in claim 1, wherein an accommodation groove is formed at an upper surface of the lower body unit and corresponding lower surface of the ball for mounting the O-ring.

3. A mounting structure of a change lever, the mounting structure comprising:

a change lever having a hollow lower end;

a generally ball-shaped member coupled to the lower end of the change lever;

a housing forming a generally spherical inner space, wherein the change lever and the generally ball-shaped member are accommodated in the housing for rotation;

a support member having a cylindrical upper body and a lower body extending from the upper body and having a generally spherical outer surface, wherein the lower body comprises a diameter greater than a diameter of the upper body, wherein the upper body is inserted into the lower hollow end of the change lever and the lower body is positioned between a lower surface of the generally ball-shaped member and an inner surface of the housing; and an O-ring positioned between the lower surface of the generally ball-shaped member and an upper surface of the lower body of the support member.

4. The mounting structure of claim 3 further comprising a groove formed in the upper surface of the lower body and a groove formed in the lower surface of the generally ball-shaped member for accommodating the O-ring between the lower surface of the generally ball-shaped member and the inner surface of the housing.

* * * * *